United States Patent Office 3,697,312
Patented Oct. 10, 1972

3,697,312
EPOXY RESIN AND GRADED ACRYLIC RUBBER-URETHANE-ACRYLATE PAINT AND PAINTING PROCESS
Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,495
Int. Cl. C08g *45/05, 41/04;* C08f *15/00*
U.S. Cl. 117—93.31                                    10 Claims

ABSTRACT OF THE DISCLOSURE

A radiation-curable paint binder dispersion comprises vinyl monomers, an alpha-beta olefinically unsaturated epoxy resin having molecular weight in excess of about 370, and an addition prouct of a hydroxy-functional graded rubber particle, a diisocyanate and a hydroxyalkyl acrylate. The dispersion is applied to substrates and cured thereon by exposure to ionizing radiation, e.g., an electron beam.

---

A unique, rubber-comprising, radiation-curable paint is provided by preparing a film-forming dispersion of vinyl monomers, and an alpha-beta olefinically unsaturated epoxy resin, and the addition product of a hydroxy-functional, graded acrylic rubber particle, a diisocyanate and a hydroxyalkyl acrylate. The dispersion is applied to substrates, e.g., wood, metal, glass, shaped polymeric solids, etc., and cured thereon by ionizing radiation, e.g., an electron beam.

(I) The epoxy resin component

The alpha-beta olefinically unsaturated epoxy resins used herein are prepared by reacting an epoxy resin, i.e., a monomeric or polymeric linear molecule having 2 or more epoxide groups in its molecular structure (a diepooxide or polyepoxide) with an alpha-beta olefinically unsaturated acid, i.e., acrylic or methacrylic acid, or a monohydroxy ester of such acid, the latter advisedly employed in excess. The epoxide reactant will ordinarily be a diepoxide having molecular weight of at least about 320 and below about 10,000, preferably between about 380 and about 3,800. The terminal unsaturated epoxy resins actually used in the paint dispersion will have a molecular weight above about 370, preferably in the range of about 500 to about 4,000, and contain about 0.5 to about 5, preferably about 0.7 to about 3.5 alpha-beta olefinic unsaturation units per 1,000 units molecular weight.

Preparation of diepoxides suitable for use in preparing the alpha-beta olefinically unsaturated epoxy resins used herein is discussed in detail in Modern Surface Coatings, Paul Nylen and Edward Sunderland, 1965 Interscience Publishers, a division of John Wiley & Sons, Ltd., London–New York–Sidney, Library of Congress Catalog No. 65–28344, pp. 197–208.

These starting polymers or prepolymers are commonly of the epichlorohydrin-bisphenol type or the epichlorohydrin-polyalcohol type. A large number of such epoxide-containing materials are commercially available. Suitable aromatic diepoxides can be synthesized by methods known to the art and many are commercially available. Some of these are illustrated hereinafter in the examples. Suitable aliphatic diepoxides can be synthesized by methods known to the art and some are also commercially available. An aliphatic diepoxide that is commercially available is 1,4-butane diol diglycidyl ether. This compound has viscosity of about 15 cps. at 25° C. and an epoxy value of about 0.75 eq./100 grams. Cycloaliphatic diepoxides are also suitable and commercially available.

The preparation of epoxy resins is disclosed in U.S. Pats. 2,467,171; 2,538,072; 2,558,959; and 2,694,694 and elsewhere throughout past and current literature. Typical examples of other suitable diepoxides include diglycidyl esters of polybasic or dibasic acids, as disclosed in U.S. Pat. No. 2,866,767; diglycidyl ethers of dihydric phenols as disclosed in U.S. Pat. Nos. 2,467,171; 2,506,486; 2,640,-037 and 2,841,595; diglycidyl ethers of diols as disclosed in U.S. Pat. Nos. 2,538,072 and 2,581,464 and diepoxides obtained by peracid epoxidation of dienes. Although the diepoxides are to be preferred for the present invention, low viscosity polyepoxides may also be advantageously used.

(II) Preparation of the graded rubber particle

The graded rubber particle has a core of crosslinked elastomeric, acrylic polymer, an outer shell comprising methyl methacrylate and a hydroxy-functional acrylate and an intermediate layer which is a copolymer of the monomers used to form the core and the monomers used to form the outer shell.

The process for preparing these particular materials is at least a two-stage process. In one method of preparation, a major amount of monofunctional monoacrylate is emulsion copolymerized in the first stage with a crosslinking amount of di- or tri-functional monomer containing 2 or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., a mixture of about 65 to about 99, preferably about 70 to about 95 mole percent methyl methacrylate and about 1 to about 35, preferably about 5 to about 30 mole percent of a hydroxylalkyl acrylate or a mixture of about 1 to about 35, preferably about 5 to about 30 mole percent of a hydroxyalkyl acrylate and about 65 to about 95 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and addition surfactant may be added simultaneously with the second stage monomeric component.

The latex is coagulated, washed and dried to yield a finely divided white powder suitable for use in this invention. Generically, the particles are prepared from monomers that will provide a crosslinked acrylic rubber-like core and a glass-like polymeric outer shell at room temperature, e.g., 20°–30° C. The terms rubber-like and glass-like are, of course, meaningless except when used in reference to a specific temperature or temperature range. The particles should be formulated so that the core retains its rubber-like properties and the outer shell retain its glass-like properties at temperatures encountered by articles of commerce in the intended field of use. Hence, for practical purposes, the monomer should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional monoacrylate and a crosslinking amount of a di- or tri-functional monomer containing 2 or more non-conjugated terminal ethylinic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,4-butylene diacrylate, 1,3-butylene dimethylacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1-trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate and diallyl phthlate. In one embodiment, the crossinking agent is a diester of acrylic or methacrylic acid and a $C_2$–$C_8$, preferably a $C_2$–$C_6$ dihydric alcohol. In another embodiment, the crosslinking agent is a triester of acrylic or methacrylic acid and a $C_2$–$C_8$, preferably a $C_2$–$C_6$, trihydric alcohol.

In the first reaction stage, there is preferably employed about 80 to about 98 mole percent of a monofunctional monoacrylate and about 20 to about 2 mole percent of the crosslinking agent. In the second reaction stage, it is preferred to use a mixture of about 65 to about 98, preferably about 70 to about 95 mole percent methyl methacrylate and about 2 to about 35, preferably about 5 to about 30 mole percent of a hydroxyalkyl acrylate. These are added before the first reaction ceases. The amounts of the second stage reactants relative to the combined first stage reactants may vary widely, depending upon the physical properties desired in the final product, i.e., from about 10 to about 90 to about 90 to about 10 weight percent. The methyl methacrylate concentration in the outer shell is advisedly at least about 30 mole percent with a balance of the monofunctional component being made up of monofunctional monoacrylates, e.g., esters of $C_2$–$C_8$ monohydric alcohols and either acrylic or methacrylic acid or monofunctional vinyl hydrocarbons such as styrene and methyl substituted styrenes, e.g., alpha methyl styrene. It will also be advantageous at times to have a limited amount of crosslinking in the outer shell and hence to include in said balance a minor amount of the diacrylate, e.g., 1 to 30 mole percent of a diester of acrylic or methacrylic acid and a $C_2$–$C_6$ dihydric alcohol or divinyl hydrocarbon, e.g., 1 to 30 mole percent of divinyl benzene. The physical properties of the outer shell may also be modified by replacing up to about 30 mole percent of the methyl methacrylate with acrylonitrile or methacrylonitrile.

The initial monomer charge is usually emulsified by 1 or more micelle-forming compounds composed of a hydrophobic part such as a hydrocarbon group containing 8 or more carbon atoms, a hydrophilic part, such as alkali metal or ammonium carboxylate groups, phosphate or sulfate partial ester groups, sulfonate groups, and the like. Exemplary emulsifying agents include alkali metal sulfonates of styrene, naphthalene, decyl benzene and dodecyl benzenes; sodium dodecyl sulfates; sodium stearate; sodium oleate; sodium alkyl aryl sulfonates; polyoxyethylene sulfates and phosphates; the ethylene oxide condensates with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unnecessary.

The polymerization initiator is composed of 1 or more water-soluble, free-radical-generating species such as hydrogen peroxide or sodium, potassium or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentene thiol, and butene thiol.

Those skilled in the art will be aware that other emulsifying agents, polymerization initiators and chain transfer agents may be used when compatible with the polymerization system herein employed.

The reaction may be carried out at temperatures from about 40° C. to about 80° C., or at lower temperatures, as from 0° C. to 80° C. in the case of activated systems.

The graded rubber particles above described and this method of preparation are disclosed by Ray A. Dickie and Seymour Newman in their patent application Serial No. 100,464, filed of even date with this application.

In another method of preparation, hereinafter illustrated, the rubber particles are formed in an aliphatic hyldrocarbon medium.

(III) The diisocyanate reactant

The preferred diisocyanate for use in this invention is toluene diisocyanate and this may be either the 2,4- or 2,6- isomer or a mixture thereof. This diisocyanate may be used without blocking or one of the isocyanate groups thereof may be blocked with caprolactam or other suitable blocking agents before use. One may also use other diisocyanates so long as one of the isocyanate groups is blocked with a suitable blocking agent. Representative of other diisocyanates which can be monoblocked and used herein are the following: 4,4'-diphenylmethane diisocyanate, 1-phenoxy-2,4'-phenylene diisocyanate, 1-tert-butyl-2,4-phenylene diisocyanate. Such blocking allows for separate stage reactions of the two isocyanate groups. Other blocking agents such as phenols and tertiary butyl alcohol may also be used. The blocking agents are selected so that the blocked isocyanate group is converted to free isocyanate group at a temperature range of about 120° C. to about 170 C. Sometimes the catalyst such as triethylene diamine or stannous octoate may be added and advantageously used in 0.05 to 1 percent concentration (basis weight of reactants) to assist the deblocking process.

A diisocyanate can be monoblocked with caprolactam by reacting the two toluene. When the first isocyanate group is blocked, the monoblocked product percipitates out of solution. See, Raymond R. Myers and J. S. Long, Film-Forming Compositions, vol. 1, Part I, p. 285, published by Marcel Dekkor, Inc., New York, U.S.A. (1961).

(IV) The hydroxy alkyl acrylate reactant

A hydroxyalkyl acrylate is reacted with the second diisocyanate group in the next step of the process. This component is preferably employed in slight excess of the amount required to react with the remaining isocyanate groups. The preferred hydroxyalkyl acrylate are hydroxyethyl acrylate, hydroxyethyl methacrylate, hydroxypropyl acrylate and hydroxypropyl methacrylate.

(V) Vinyl monomers employed in the paint dispersion

The paint binder dispersion advantageously contains about 20 to about 80, preferably about 25 to about 75, weight percent vinyl monomers and about 20 to about 80, preferably about 25 to about 75, weight percent of the polymer component. This polymeric component consists essentially of rubber-urethane-acrylate addition product hereinbefore described and the alpha-beta, olefinically unsaturated epoxy resin hereinbefore described. The relative concentration of these two constituents of the polymeric component may vary widely, e.g., the polymeric component may comprise about 2 to about 98, preferably 5 to about 95, weight percent of the alpha-beta olefinically unsaturated vinyl resin and about 98 to about 2, preferably 95 to 5, weight percent of the rubber-urethane-acrylate addition product.

Monomer type and concentration provides one means for adjusting the viscosity of the paint dispersion to conform to the methods of application desired, e.g., spray coating, roll coating, etc. In functional terms, the amount of vinyl monomer present is at least sufficient to convert the alphabeta olefinically unsaturated rubber-urethane-acrylate addition product and the alpha-beta, olefinically unsaturated epoxy resin into a crosslinked continuous coating on the surface of a substrate when a film of such coating dispersion is applied thereto and exposed to ionizing radiation, e.g., an electron beam.

Vinyl monomers employed may be monofunctional monoacrylates, especially esters of acrylic or methacrylic acid and a $C_1$-$C_8$, preferably a $C_1$-$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent of diacrylates, e.g., the diesters of acrylic or methacrylic acid and a $C_2$-$C_6$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of $C_1$-$C_8$ monohydric alcohols and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

(VI) Preparation and application of the coating dispersion to a substrate

By adjusting the viscosity of the coating dispersion to a viscosity compatible with the desired method of coating, these coatings may be applied by any of the conventional methods, e.g., brushing, spraying, roll coating, curtain coating, flow coating, etc.

The viscosity of the paint binder solution may be adjusted by varying the molecular weight of the rubber-urethane-acrylate addition product. This may be accomplished by controlling the average number of functional groups per molecule through control of the concentration of the hydroxyalkyl acrylate constituent in the final portion of the monomer mixture introduced into the reaction medium when the graded rubber particle is produced. The viscosity may also be regulated by varying the relative concentration of the polymeric component with respect to the vinyl monomer component and/or by varying the relative concentrations of dissimilar monomers within the vinyl monomer component. The paint binder dispersion may be applied to the substrate essentially free of non-polymerizable, organic solvent and/or diluents or it may be applied with the solvent and/or diluents in a method of application wherein the solvent and/or diluents are flashed off prior to polymerization.

Coatings may be applied to any substrate, e.g., metal, wood, glass, shaped polymeric solids, etc. These coatings will ordinarily be applied to an average depth in the range of about 0.1 to about 4 mils, more commonly about 0.5 to about 2 mils.

(VII) Curing the coatings

Films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation energy is applied at dosage rates of about 0.1 to about 100 Mrad per second on a workpiece, preferably a moving workpiece, with the coating receiving a total dose in the range of about 1 to about 25, commonly about 8 to about 15 Mrad.

The term "ionizing radiation" as employed herein means radiation having sufficient energy to remove an electron beam; from a gas atom, forming an ion, preferably radiation with minimum energy of, or equivalent to, at least about 5,000 electron volts except when the curing is carried out in vacuum. The preferred method of curing films of the instant paint binder on the substrates to which they have been applied is by subjecting such films to a beam of polymerization-effecting electrons which at its source of emission is within the range of, or equivalent to, about 100,000 to about 500,000 electron volts. If irradiation is carried out in vacuum or at reduced pressure, this energy range may be much lower. In this method of curing, it is preferred to employ a minimum of about 25,000 volts per inch of distance between the radiation emitter and the workpiece when the intervening space is occupied by air or other gas of comparable density. Adjustment is made for the relative resistance of the intervening gas which is preferably an oxygen-free inert gas such as nitrogen or helium.

In this application, the term "paint" is meant to include finely ground pigment and/or filler in the binder, the binder without pigment and/or filler or having very little of the same, which can be tinted if desired. Thus, the binder which is ultimately converted to a durable film resistant to wear, weather, etc., can be all or virtually all that is used to form the film or it can be a vehicle for pigmentary and/or mineral filler material.

The abbreviation "Mrad" as employed herein means 1 million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum, aluminum-copper alloy, or magnesiumthorium alloy of about 0.003 inch thickness. This invention will be more fully understood from the following examples.

(I) Graded rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about ⅛ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is added at a rate such that the temperature of the reaction mixture is maintained at 47° to 50° C. During addition of the last ⅔ of the first monomer mixture, 5.72 parts by weight sodium dodecyl sulfate dissolved in 35.7 parts by weight water are added at a substantially constant rate. The reaction mixture is maintained at about 47° to 50° C. for about 60 minutes prior to beginning simultaneous dropwise addition of the mixture of 1180 parts by weight methyl methacrylate and 425 parts by weight hydroxyethyl methacrylate, 30 parts by weight dodecyl mercaptan and 2.86 parts by weight sodium dodecyl sulfate dissolved in 35.7 parts by weight water. This addition, which requires about 30 minutes, is carried out at a rate such that the temperature of the reaction mixture is maintained at about 47° to 50° C. Following this addition, the mixture is maintained at 47° to 49° C., for an additional 2 hours.

The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

II. Determination of the concentration of the reactive hydroxyl groups on the surfaces of the particles is made by the well known method of analysis wherein the hydroxy groups are reacted with acetic acid using a pyridine catalyst. The acetic acid is then back titrated with sodium hydroxide. For details, reference is made to A. Steyermark, Quantitative Organic Analysis pp. 302–303, published by Blakiston Company, New York, Toronto and Philadelphia (1951).

III. The hydroxy-functional graded rubber particles prepared in I above are reacted with a diisocyanate using the following procedure: The hydroxy-functional particles in the quantity providing 1 mole of reactive hydroxy groups on the collective surfaces thereof are suspended in toluene and 2,4-toluene diisocyanate, in the quantity necessary to provide about 3 isocyanate groups per each hydroxyl group, is incrementally added at a rate slow enough to keep the temperature of the reaction mix below 32° C. After the initial exotherm subsides, the reaction mixture is stirred for 1 hour.

IV. The rubber-diisocyanate adduct is reacted with a hydroxyalkyl acrylate using the following procedure: The temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. A rubber-urethane-acrylate product, hereinafter referred to as a resin, is ready for employment in the coating compositions.

V. Paint dispersions are prepared from the rubber-urethane-acrylate resin, vinyl monomers and an alpha-beta, olefinically unsaturated, epoxy resin prepared by the following procedure: To a 2,000 ml. 3-neck flask equipped with stirrer, dropping funnel, thermometer, and nitrogen inlet, is added 1 mole of 2,3-butane diol (91.12 gms.) and 4 moles of epichlorohydrin (370.0 gms.). The temperature is maintained at 110° C. while 2 moles sodium hydroxide (30.0 gms.) is added dropwise as a 30 percent aqueous solution. The rate of addition is regulated so that the reaction mixture remains neutral. After about 3 hours, the organic layer is separated, dried, distilled and a polymer is recovered. This polymeric product is represented by the following structural formula:

FORMULA I

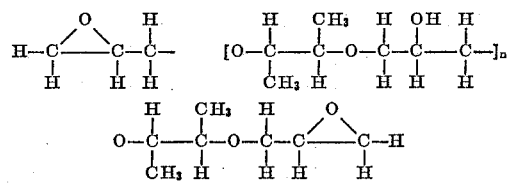

To 210 grams of this polymer are added 86 grams of methacrylic acid containing 0.1 gram hydroquinone. While stirring in a nitrogen atmosphere, the mixture is heated to 140° C. for 20 minutes and then cooled to room temperature, i.e., 26° C. The unsaturated polyepoxide polymer formed is represented by the following structural formula:

FORMULA II

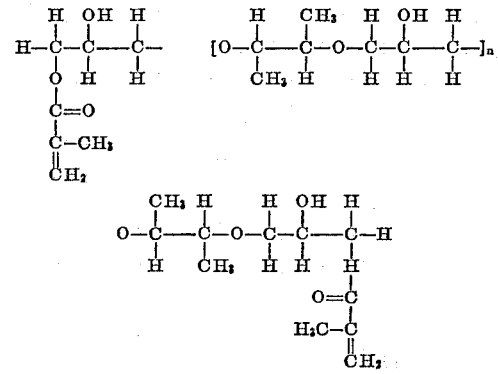

A first paint dispersion is prepared using 50 parts by weight of this alpha-beta olefinically unsaturated epoxy resin and about 25 parts by weight of the rubber-urethane-acrylate resin and about 25 parts by weight methyl methacrylate. A second paint dispersion is prepared using 25 parts by weight of this alpha-beta olefinically unsaturated epoxy resin, about 50 parts by weight of the rubber-urethane-acrylate resin and about 25 parts by weight methyl methacrylate. A third paint dispersion is prepared using about 30 parts by weight of this alpha-beta olefinically unsaturated epoxy resin, about 10 parts by weight of the rubber-urethane-acrylate resin and about 60 parts by weight methyl methacrylate. A fourth paint dispersion is prepared by using about 40 parts by weight of this alpha-beta olefinically unsaturated epoxy resin about 5 parts by weight of the rubber-urethane-acrylate, and about 55 parts by weight of methyl methacrylate.

VI. Coating of substrates: The dispersions prepared in V above are separately coated on substrate of steel, wood, glass, and polymeric solids, i.e., acrylonitrile-butadiene-styrene copolymer, to an average depth of about 7/10 mils (0.0007 inch) and irradiated with an electron beam. The conditions of irradiation are as follows:

Potential: 275 kv.
Current: 30 milliamperes
Distance emitter from workpiece: 10 inches
Dose: 10 Mrad
Atmosphere: Nitrogen

EXAMPLE 2

The procedure of Example 1 is repeated with the difference that an equimolar amount of ethyl acrylate is substituted for the butyl acrylate used in the first monomer mixture to form the core of the graded rubber particle and ½ of the methyl methacrylate used to form the coating dispersions with the alpha-beta olefinically unsaturated epoxy resin and the rubber-urethane-acrylate addition product is replaced with an equimolar amount of styrene.

EXAMPLE 3

The procedure of Example 1 is repeated with the difference that an equimolar amount of 2-ethyl hexyl acrylate is substituted for the butyl acrylate used in the first monomer mixture to form the core of the graded rubber particle, the second monomer mixture used to form the shell of the graded rubber particles is a mixture of about 40 mole percent methyl methacrylate, 15 mole percent ethyl acrylate, 10 mole percent butyl acrylate, 10 mole percent acrylonitrile, 25 mole percent hydroxyethyl acrylate and the vinyl monomer component used to form the coating dispersion with the rubber-urethane-acrylate addition product and the epoxy resin is a mixture of 30 mole percent of methyl methacrylate, 20 mole percent butyl methacrylate, 10 mole percent 2-ethyl hexyl acrylate, 20 mole percent styrene and 20 mole percent vinyl toluene. The second monomer mixture is divided into four equal fractions each of which is added incrementally. The hydroxyethyl acrylate is added to the reaction mixture with the last of these fractions.

EXAMPLE 4

The procedure of Example 1 is repeated with the difference that an equimolar amount of cyclohexyl acrylate is substituted for the butyl acrylate and an equimolar amount of 1,3-butylene diacrylate is substituted for the 1,3-butylene dimethacrylate used in the first monomer mixture to form the core of the graded rubber particles, the second monomer mixture used to form the shell of the graded rubber particles is a mixture of 30 mole percent methyl methacrylate, 15 mole percent methacrylonitrile, 10 mole percent styrene, 10 mole percent 1,3-butylene dimethacrylate, 5 mole percent vinyl acetate and 30 mole percent hydroxypropyl methacrylate, and the vinyl monomer used to form the coating dispersion with the rubber-urethane-acrylate addition product and the alpha-beta olefinically unsaturated epoxy resin is a mixture of 70 mole percent of methyl methacrylate, 20 mole percent alpha methyl styrene and 10 mole percent 1,3-butylene dimethacrylate.

EXAMPLE 5

The procedure of Example 1 is repeated with the difference that an equimolar amount of 1,3-hexamethylene diacrylate is substituted for the 1,3-butylene dimethacrylate used in the first monomer mixture to form the core of the graded rubber particle.

EXAMPLE 6

The procedure of Example 1 is repeated with the difference that an equimolar amount of divinyl benzene is substituted for the 1,3-butylene dimethacrylate used in the first monomer mixture to form the core of the graded rubber particle, the second monomer mixture used to form the shell of said particle is a mixture of 50 mole percent of methyl methacrylate, 10 mole percent acrylonitrile, 10 mole percent divinyl benzene and 30 mole percent hydroxypropyl acrylate and the vinyl monomer used to form the coating dispersion with the rubber-urethane-acrylate addition product and the alpha-beta olefinically unsaturated epoxy resin is a mixture of 60 mole percent methyl methacrylate, 20 mole percent styrene, 10 mole percent butyl acrylate and 10 mole percent vinyl benzene.

EXAMPLE 7

The procedure of Example 1 is repeated with the difference that a single paint dispersion is prepared using 60 weight percent of the methyl methacrylate and 40 weight percent of a polymeric component of which 50 weight percent is the rubber-urethane-acrylate addition product and 50 weight percent is the alpha-beta olefinically unsaturated epoxy resin.

EXAMPLE 8

The procedure of Example 1 is repeated with the difference that a single paint dispersion is prepared using 40 weight percent of the methyl methacrylate and 60 weight percent of the polymeric component which is made up of 50 weight percent of the rubber-urethane-acrylate addition product and 50 weight percent of the alpha-beta olefinically unsaturated epoxy resin.

EXAMPLE 9

The procedure of Example 1 is repeated except for the differences that the second monomer mixture introduced into the reaction mixture to form the shell of the hydroxy-functional graded rubber product is a mixture of about 95 mole percent methyl methacrylate and about 5 mole percent hydroxyethyl methacrylate. The second monomer mixture is divided into 10 equal fractions each of which is added incrementally. The hydroxyethyl methacrylate is added to the reaction mixture with the last 1/10 of the monomer mixture.

EXAMPLE 10

The procedure of Example 1 is repeated except for the differences that the second monomer mixture introduced into the reaction mixture to form the shell of the hydroxy-functional graded rubber product is a mixture of about 85 mole percent methyl methacrylate and about 15 mole percent hydroxyethyl acrylate. The second monomer mixture is divided into 5 equal fractions each of which is added incrementally. The hydroxyethyl acrylate is added to the reaction mixture with the last 1/5 of the monomer mixture.

EXAMPLE 11

The procedure of Example 1 is repeated with the difference that the curing is carried out in helium atmosphere and the potential of the electron beam upon exiting from the electron window into such atmosphere is about 260 kv.

EXAMPLE 12

The procedure of Example 1 is repeated with the differences that the curing is carried out in a nitrogen atmosphere containing a minor amount of $CO_2$ and the potential of the electron beam upon exiting from the electron window into such atmosphere is about 295 kv.

EXAMPLE 13

Substrates are coated in accordance with this invention using the following procedure:

(I) Graded rubber particles are prepared in an organic medium using the procedures set forth below:

(A) A mixture is formed from the following materials:

| Materials: | Grams |
|---|---|
| Ethyl acrylate | 400 |
| 1,3-butylene dimethacrylate | 100 |
| Dispersion agent [1] | 15 |
| AIBN [2] | 5 |

[1] An amphipathic copolymer (1) portion soluble in the acrylic monomers and the other portions soluble in the solvent, e.g., dodecane (is prepared by reacting 12-hydrostearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using a AIBN initiator (9 g.) and butyl acetate solvent. This method of producing this dispersion agent is described in detail by K. E. G. Barratt and H. R. Thomas, Journal of Polymer Science, part I, vol. 7, 2625 (1969). Other dispersing agents which are effective for stabilizing suspensions in hydrocarbon liquids may be used in place of the above described materials.
[2] 2,2' azobis-(2-methylpropionitrile).

(B) The mixture of the above listed material is added to 1,000 grams n-dodecane under nitrogen. The mix is warmed to 40° C. When the exotherm starts the temperature is allowed to rise to 80° C. The temperature is maintained at 80° C. for 30 minutes.

(C) The reaction mixture is maintained in a nitrogen atmosphere and there is added slowly with stirring a mixture of the following materials:

| Materials: | Grams |
|---|---|
| Methyl methacrylate | 320.0 |
| Hydroxyethyl methacrylate | 80.0 |
| Dispersing agent [1] | 3.0 |
| AIBN | 6.0 |
| n-dodecane | 1000.0 |

[1] An amphipathic copolymer (1) portion soluble in the acrylic monomers and the other portions soluble in the solvent, e.g., dodecane is prepared by reacting 12-hydrostearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equal amount of methyl methacrylate using a AIBN initiator (9 g.) and butyl acetate solvent. This method of producing this dispersion agent is described in detail by K. E. G. Barratt and H. R. Thomas, Journal of Polymer Science, part I, vol. 7, 2625 (1969). Other dispersing agents which are effective for stabilizing suspensions in hydrocarbon liquids may be used in place of the above described materials.

(II) The hydroxy-functional graded rubber particles prepared in I above are reacted with a diisocyanate using the following procedure: The temperature of the reaction mixture is allowed to cool to 30° C. There is added slowly 132 g. of 2,4-toluene diisocyanate. The temperature is maintained in the range of 30°–35° C. for 2 hours.

(III) There is added to the reaction mix 125 grams of hydroxyethyl methacrylate. The reaction mix is then heated at 45° C. for 4 hours. The rubber-urethane-acrylate addition product particles are separated from the solvent by filtration.

(IV) Paint dispersions are prepared using 40 parts by weight of an equimolar mixture of methyl methacrylate and styrene, and 60 parts by weight of a polymeric component consisting of 5 parts by weight of an alpha-beta olefinically unsaturated epoxy resin [1] and 2 parts by weight of the rubber-urethane-acrylate addition product.

Separate tests are carried out using three of these starting resins. These have the following typical properties:

| Trademark [1] | Melting range, °C. | Viscosity in poise at 25° C. | Epoxide equivalent [2] | Equivalent weight [3] | Molecular weight average | n in the formula average value |
|---|---|---|---|---|---|---|
| Epon 828 | Liquid | 100–150 | 175–210 | 85 | 380 | |
| Epon 834 | do | [4] 3.8–9.0 | 225–290 | 105 | 470 | 0.5 |
| Epon 1001 | 64–76 | [5] 0.8–1.7 | 450–525 | 130 | 900 | 2.0 |

[1] Shell Chemical Co., in Europe the trade name "Epikote" followed by the same figures.
[2] Grams of resin containing 1 g.-equivalent of epoxide.
[3] Grams of resin required to esterify completely.
[4] Available as a 70% solution in butyl carbitol.
[5] Available as a 40% solution in butyl carbitol.

(V) Coating of substrates: The paint dispersions prepared in IV are sprayed upon substrates of steel, aluminum, glass, paper, wood and shaped polymeric solid, i.e., polypropylene, to an average depth of about 1.5 mils and cured thereon by placing said substrates into a nitrogen atmosphere and exposing the coated surfaces to an electron beam (potential 275 KV-current 30 milliamperes) until the coatings on the surfaces of the substrates are tack-free to touch.

EXAMPLE 14

The procedures of Example 13 are repeated with differences that an equimolar amount of 1-tert-butyl-2,4 phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of the Section III of Example 13 is modified in that, as the hydroxyethyl methacrylate monomer is dispersed in the reaction, the temperature of the reaction mixture is raised to about 150° C. and maintained at a temperature of about 150° C. and the reaction mixture is stirred for about 30 minutes.

EXAMPLE 15

The procedure of Example 13 is repeated with the differences that an equimolar amount of 1-ethyl-2,4-phenylene diisocyanate is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. and the reaction mixture is stirred for about 30 minutes.

EXAMPLE 16

The procedure of Example 13 is repeated with the differences that an equimolar amount of 4,4'-diphenylmethane diisocyanate with 1 isocyanate group per molecule blocked with caprolactam is substituted for the 2,4-toluene diisocyanate and the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-phenoxy-2,4-phenylene diisocyanate with 1 isocyanate group per molecule blocked with caprolactam is substituted for the 2,4-toluene diisocyanate in the reaction of diisocyanate with hydroxy-functional graded rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedure of Example 13 is repeated except that an equimolar amount of acrylic acid is substituted for the methacrylic acid used in preparing the alpha-beta olefinically unsaturated epoxy resin.

EXAMPLE 19

The procedure of Example 13 is repeated except that the depth of coating is varied in separate tests using films of 0.2, 0.5, 1.0, 2.0 and 3.5 mils. Irradiation is continued until tack-free films are achieved.

EXAMPLE 20

The procedure of Example 1 is repeated with the difference that the paint dispersion consists of 40 parts by weight of an equimolar mixture of methyl methacrylate and styrene and 60 parts by weight of a polymeric component consisting of 55 parts by weight of the alpha-beta

[1] This alpha-beta olefinically unsaturated epoxy resin is prepared from a commercially available epoxy resin of the Bisphenol-A-epichlorohydrin type. This epoxy resin is reacted with methacrylic acid using the procedure of Example 1 to provide such resin with alpha-beta olefinic unsaturation. The commercially available starting resin is represented by the following formula:

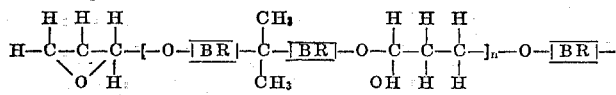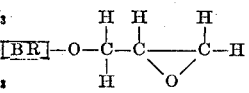

NOTE.—BR refers to benzene ring.

olefinically unsaturated epoxy resin and about 5 parts by weight of the rubber-urethane-acrylate addition product.

EXAMPLE 21

The procedure of Example 13 is repeated with the difference that the paint dispersion consists of 40 parts by weight styrene and 60 parts by weight of a polymeric component consisting of 50 parts by weight of the alpha-beta olefinically unsaturated epoxy resin and about 10 parts by weight of the rubber-urethane-acrylate addition product.

EXAMPLE 22

The procedure of Example 1 is repeated with the difference that the paint dispersion consists of 40 parts by weight methyl methacrylate and styrene in an equimolar mixture and 60 parts by weight of a polymeric component consisting of 5 parts by weight of the alpha-beta olefinically unsaturated epoxy resin and 55 parts by weight of the rubber-urethane-acrylate addition product.

EXAMPLE 23

The procedure of Example 13 is repeated with the difference that the paint dispersion consists of 60 parts by weight of a vinyl monomer mixture made up of 30 mole percent methyl methacrylate, 20 mole percent ethyl acrylate, 10 mole percent butyl methacrylate, 10 mole percent butyl acrylate, 15 mole percent 2-ethyl hexyl acrylate and 15 mole percent styrene and 40 parts by weight of a polymeric component consisting of about 10 parts by weight of the olefinically unsaturated epoxy resin and about 50 parts by weight of the rubber-urethane-acrylate addition product.

EXAMPLE 24

The procedures of Examples 1 and 13 are repeated except for the difference that a functionally equivalent amount of 1,1,1-trimethylolethane triacrylate is substituted for the 1,3-butylene dimethacrylate in the formation of the hydroxy-functional graded rubber particle.

EXAMPLE 25

The procedures of Examples 1 and 13 are repeated except for the difference that a functionally equivalent amount of 1,1,1-trimethylolpropane trimethacrylate is substituted for the 1,3-butylene dimethacrylate in the formation of the hydroxy-functional graded rubber particle.

EXAMPLE 26

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional graded rubber particle.

The terms "acrylate" and "acrylates," when used herein without a modifier distinguishing between esters of acrylic acid and methacrylic acid shall be understood to include both. This, of course, does not apply to the naming of a specific compound.

It will be understood by those skilled in the art that modifications can be made within the foregoing examples within the scope of the invention as hereinbefore described and hereinafter claimed.

We claim:
1. A radiation-curable paint which on a pigment and mineral filler-free basis comprises a film-forming dispersion of about 20 to about 80 weight percent vinyl monomers and about 80 to about 20 weight percent of a polymeric component consisting essentially of (A) about 2 to about 98 weight percent of an alpha-beta olefinically unsaturated resin having average molecular weight in the range of about 370 to about 4,000 and being formed by reacting an epoxy compound containing at least two epoxide groups per molecule with acrylic acid, methacrylic acid or a hydroxyalkyl ester of acrylic or methacrylic acid, the latter being employed in an amount sufficient to provide the resultant alpha-beta olefinically unsaturated resin with about 0.5 to about 5 units of alpha-beta olefinic unsaturation per 1,000 units molecular weight, and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
(1) from about 10 to about 90 weight percent of a core of crosslinked acrylic polymer consisting essentially of
  (a) about 80 to about 98 mole percent of a monoester of acrylic acid and a $C_2$–$C_8$ monohydric alcohol, and
  (b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.
(2) from about 90 to about 10 weight percent of an outer shell having glass transition temperature at least 50° C. above that of said core and consisting essentially of the polymerization product of monomer mixtures selected from the group consisting of
  (a) about 65 to about 98 mole percent methyl methacrylate and about 2 to about 35 mole percent of a hydroxy-functional acrylate selected from hydroxyethyl acrylate, hydroxy-ethyl methacrylate, hydroxypropyl methacrylate, hydroxypropyl acrylate and hydroxypropyl methacrylate, and
  (b) about 2 to about 35 mole percent of a hydroxy-functional acrylate selected from hydroxyethyl acrylate, hydroxyethyl methacrylate, hydroxypropyl acrylate, and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_8$ dihydric alcohol and 0 to 30 mole percent of a monomer selected from acrylonitrile, methacrylonitrile and vinyl acetate.

2. A paint in accordance with claim 1 wherein said core is crosslinked acrylic polymer consisting essentially of butyl acrylate and 1,3-butylene dimethacrylate.

3. A paint in accordance with claim 1 wherein said core is a crosslinked acrylic polymer consisting essentially of 2-ethyl hexyl acrylate and 1,3-butylene diamethacrylate.

4. A paint in accordance with claim 1 wherein said hydroxy-alkyl acrylate is selected from hydroxyethyl acrylate, hydroxyethyl methacrylate, hydroxypropyl acrylate and hydroxypropyl methacrylate.

5. A paint in accordance with claim 1 wherein said vinyl monomers are selected from esters of acrylic or methacrylic acid and a $C_1$–$C_8$ monohydric alcohol, a $C_8$–$C_9$, monovinyl hydrocarbon, and 0 to 30 mole percent of a difunctional compound selected from divinyl benzene and diesters of acrylic or methacrylic acid and a $C_2$–$C_6$ dihydric alcohol.

6. A paint in accordance with claim 1 wherein the graded rubber particle used to form said rubber-urethane-acrylate addition product has an average diameter in the range of about 0.04 to about 1 micron.

7. A paint in accordance with claim 1 wherein said film-forming dispersion consist essentially of about 25 to about 75 weight percent vinyl monomers and about 75 to about 25 weight percent of said polymeric component.

8. A radiation-curable paint which on a pigment and mineral filler-free basis comprises a film-forming dispersion of about 25 to about 75 weight percent vinyl monomers and about 75 to about 25 weight percent of a polymeric component consisting essentially of (A) about 2 to about 98 weight percent of an alipha-beta olefinically unsaturated resin having average molecular weight in the range of about 370 to about 4000, said alpha-beta olefinically unsaturated resin being formed by reacting a diepoxide with acrylic or methacrylic acid in an amount sufficient to provide the resultant alpha-beta olefinically unsaturated resin with about 0.7 to about 3.5 units of alpha-beta olefinic unsaturation per 1,000 units molecular weight, and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
  (1) from about 10 to about 90 weight percent of a core of crosslinked acrylic polymer consisting essentially of
    (a) about 80 to about 98 mole percent of an ester of acrylic acid and a $C_2$–$C_8$ monohydric alcohol, and
    (b) about 2 to about 20 mole percent of divinyl benzene or a diester of acrylic or methacrylic acid and a $C_2$–$C_8$ dihydric alcohol,
  (2) from about 90 to about 10 weight percent of an outer shell having glass transition temperature of at least 50° C. above that of said core and consisting essentially of the polymerization product of monomer mixtures selected from the group consisting of
    (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate and
    (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difuctional compound selected from divinyl benzene, and diesters of acrylic or methacrylic acid and a $C_2$–$C_6$ dihydric alcohol and 0 to 30 mole percent of a monomer selected from acrylonitrile, methacrylonitrile and vinyl acetate.

9. The method of coating a substrate which comprises:
(I) Applying to a surface of said substrate a film of radiation-curable paint which on a pigment and mineral filler-free basis comprises a film-forming dispersion of about 20 to about 80 weight percent of vinyl monomers and about 80 to about 20 weight percent of a polymeric component consisting essentially of (A) about 2 to about 98 weight percent of an alpha-beta olefinically unsaturated resin formed by reacting an epoxy compound containing at least two epoxide groups per molecule with acrylic acid, methacrylic acid, or a hydroxyalkyl ester of acrylic or methacrylic acid, the latter being employed in an amount sufficient to provide the resultant alpha-beta olefinically unsaturated resin with about 0.7 to about 3.5 units of alpha-beta olefinic unsaturation per 1,000 units of molecular weight, and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
  (1) from about 10 to about 90 weight percent of a core of crosslinked acrylic polymer consisting essentially of
    (a) about 80 to about 98 mole percent of a monoester of acrylic acid and a $C_2$–$C_8$ monohydric alcohol, and
    (b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.
  (2) from about 90 to about 10 weight percent of an outer shell having glass transition temperature of at least 50° C. above that of said core and consisting essentially of the polymerization product of monomer mixtures selected from the group consisting of
    (a) about 70 to about 95 mole percent methyl methacrylate and about 5 to about 30 mole percent of a hydroxy-functional acrylate selected from hydroxyethyl acrylate, hydroxyethyl methacrylate, hydroxypropyl acrylate and hydroxypropyl methacrylate and,
    (b) about 5 to about 30 mole percent of a hydroxy-functional acrylate selected from hydroxyethyl acrylate, hydroxyethyl methacrylate, hydroxypropyl acrylate and hydroxypropyl methacrylate and about 70 to 95 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene, and diesters of acrylic or methacrylic acid and a $C_2$–$C_6$ dihydric alcohol and 0 to 30 mole percent of a monomer selected from acrylonitrile, methacrylonitrile and vinyl acetate.
(II) Crosslinking said film upon said substrate by exposing said film to a beam of electrons having average energy in the range of about 100,000 to about 500,000 electron volts.

10. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 80 weight percent vinyl monomers and about 80 to about 20 weight percent of a polymeric component consisting essentially of (A) about 2 to about 98 weight percent of an alpha-beta olefinically unsaturated resin having average molecular weight in the range of about 370 to about 4,000 and being formed by reacting an epoxy compound containing at least two epoxide groups per molecule with acrylic acid, methacrylic acid or a hydroxyalkyl ester of acrylic or methacrylic acid, the latter being employed in an amount sufficient to provide the resultant alpha-beta olefinically unsaturated resin with about 0.5 to about 5 units of alpha-beta olefinic unsaturation per 1,000 units molecular weight, and (B) about 98 to about 2 weight percent of a rubber-urethane-acrylate addition product formed by reacting a first isocyanate group of a diisocyanate with a hydroxy-functional particle of graded rubber and reacting the remaining isocyanate group of said diisocyanate with a hydroxyalkyl acrylate, said particle of graded rubber consisting essentially of
  (1) from about 10 to about 90 weight percent of a core of crosslinked acrylic polymer consisting essentially of
    (a) about 80 to about 98 mole percent of a monoester of acrylic acid and a $C_2$–$C_8$ monohydric alcohol, and (b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol.

(2) from about 90 to about 10 weight percent of an outer shell having glass transition temperature at least 50° C. above that of said core and consisting essentially of the polymerization product of monomer mixtures selected from the group consisting of (a) about 65 to about 98 mole percent methyl methacrylate and about 2 to about 35 mole percent of a hydroxy-functional acrylate selected from hydroxyethyl acrylate, hydroxy-ethyl methacrylate, hydroxypropyl methacrylate, hydroxypropyl acrylate and hydroxypropyl methacrylate, and (b) about 2 to about 35 mole percent of a hydroxy-functional acrylate selected from hydroxyethyl acrylate, hydroxyethyl methacrylate, hydroxypropyl acrylate, and hydroxypropyl methacrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and $C_2$–$C_8$ dihydric alcohol and 0 to 30 mole percent of a monomer selected from acrylonitrile, methacrylonitrile and vinyl acetate.

No references cited.

PAUL LIEBERMAN, Primary Examiner

U.S. Cl. X.R.

260—77.5 CR, 77.5 TB, 836, 837 R, 859, 885